United States Patent
Batarseh et al.

(10) Patent No.: US 6,970,364 B2
(45) Date of Patent: Nov. 29, 2005

(54) LOW COST AC/DC CONVERTER WITH POWER FACTOR CORRECTION

(75) Inventors: Issa Batarseh, Oviedo, FL (US); Weihong Qui, Kent, WA (US); Wenkal Wu, Orlando, FL (US); Shiguo Luo, Plano, TX (US); Moussaoui Zaki, Palm Bay, FL (US)

(73) Assignee: University of Central Florida, Orlando, FL (US)

( * ) Notice: Subject to any disclaimer, the term of this patent is extended or adjusted under 35 U.S.C. 154(b) by 105 days.

(21) Appl. No.: 10/383,395

(22) Filed: Mar. 7, 2003

(65) Prior Publication Data

US 2003/0174521 A1 Sep. 18, 2003

Related U.S. Application Data

(60) Provisional application No. 60/363,145, filed on Mar. 8, 2002.

(51) Int. Cl.[7] .......................... H02M 3/335; G05F 1/10
(52) U.S. Cl. ....................... 363/16; 363/21.1; 323/222
(58) Field of Search .............................. 363/16, 17, 19, 363/21.4, 21.01, 20, 21.09, 21.12, 21; 323/222, 285, 271, 282

(56) References Cited

U.S. PATENT DOCUMENTS

| | | | |
|---|---|---|---|
| 4,641,229 A | * | 2/1987 | Easter ..................... 363/21.18 |
| 5,146,394 A | | 9/1992 | Ishii et al. ..................... 363/16 |
| 5,757,626 A | * | 5/1998 | Jovanovic et al. ........ 363/21.04 |
| 5,796,595 A | | 8/1998 | Cross .......................... 363/16 |
| 5,909,361 A | | 6/1999 | Kim ............................. 363/21 |
| 5,982,638 A | | 11/1999 | Tang et al. ..................... 363/21 |
| 5,991,172 A | * | 11/1999 | Jovanovic et al. ........ 363/21.14 |
| 6,005,782 A | | 12/1999 | Jain et al. ..................... 363/21 |
| 6,031,747 A | | 2/2000 | Ilic et al. ..................... 363/71 |
| 6,115,267 A | | 9/2000 | Herbert ........................ 363/25 |
| 6,272,027 B1 | | 8/2001 | Fraidlin et al. ................ 363/26 |
| 6,281,666 B1 | | 8/2001 | Tressler et al. ............. 323/272 |
| 6,282,109 B1 | | 8/2001 | Fraidlin et al. ................ 363/89 |

OTHER PUBLICATIONS

Redl, et al., "A New Family of Single–Stage Isolated Power–Factor Correctors with Fast Regulation of the Output Voltage", PESC '94, pp. 1137–1144, vol. 2, Jun. 1994.

Qiao, et al., "A Topology Survey of Single–Stage Power Factor Corrector with a Boost Type Input–Current–Shaper", APEC 2000, pp. 460–467, vol. 1, Mar. 2000.

Luo, et al., "Flyboost Power Factor Correction Cell and Its Applications in Single–Stage AC–DC Converters", PSEC, 2002.

Jiang, et al., "A Novel Single–Phase Power Factor Correction Scheme", APEC '93, PGs 287–292, Mar. 1993.

Garcia, et al., "Power Factor Correction: A Survey", PESC '01, pp. 8–13, vol. 1, Jun. 2001.

* cited by examiner

Primary Examiner—Rajnikant B. Patel
(74) Attorney, Agent, or Firm—Brian S. Steinberger; Law Offices of Brian S. Steinberger, P.A.

(57) ABSTRACT

A high performance single stage Power Factor Correction (PFC) converter with tight output voltage regulation and a very simple circuit to carry out those functions, which means its cost is lower than its counterparts. Two basic flyback circuits include a simple control circuit. For the hard switching circuit, only one switch is used to achieve low cost; for the soft switching scheme, one auxiliary switch is added to get higher efficiency and smaller size. There are two power flow paths, resulting in part power processed by an active switch only once to reduce the current stress and improve the efficiency. A direct current (DC) bus voltage will be limited to the peak value of input voltage. The maximum DC bus voltage will be less than 400 and a single commercial capacitor can be used for universal voltage stress under light load condition.

10 Claims, 6 Drawing Sheets (a) Basic topology

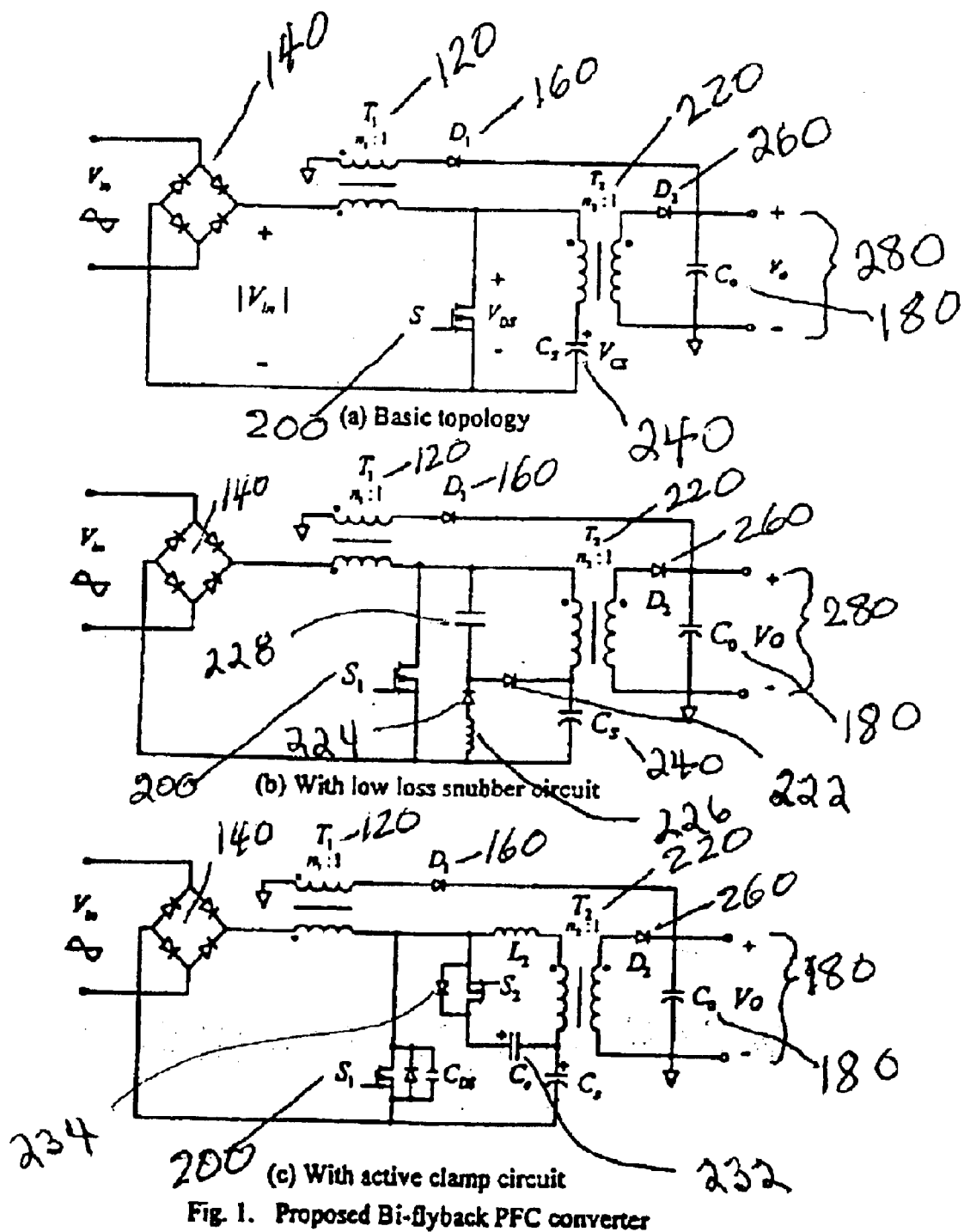
Fig. 1. Proposed Bi-flyback PFC converter

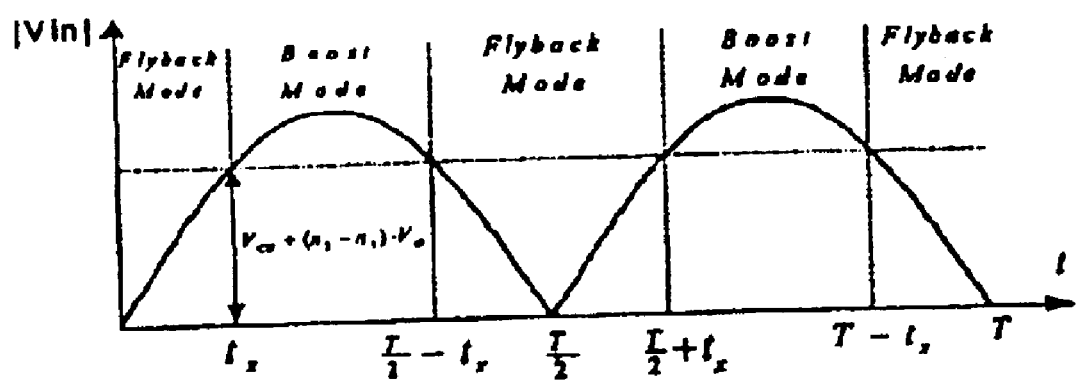
Fig. 2. Operation mode in one line period

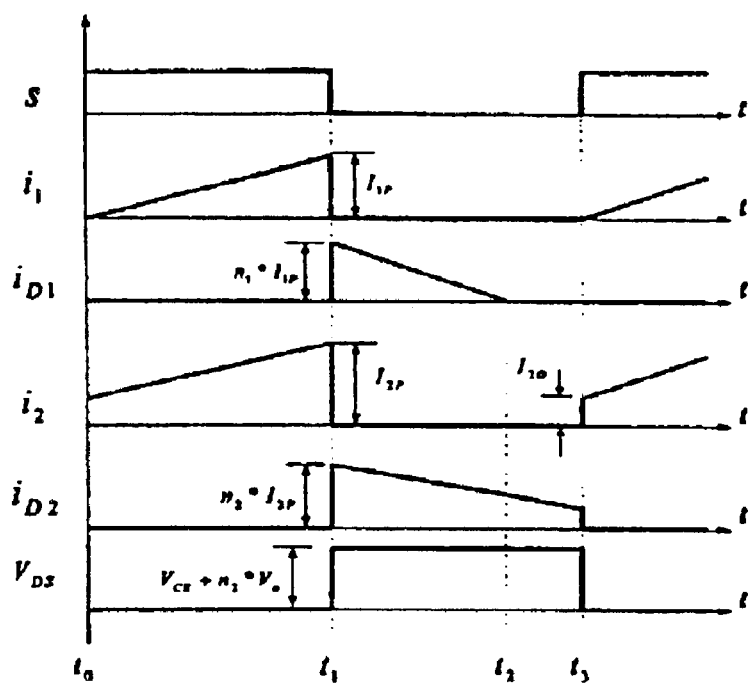
(a) Operation waveforms
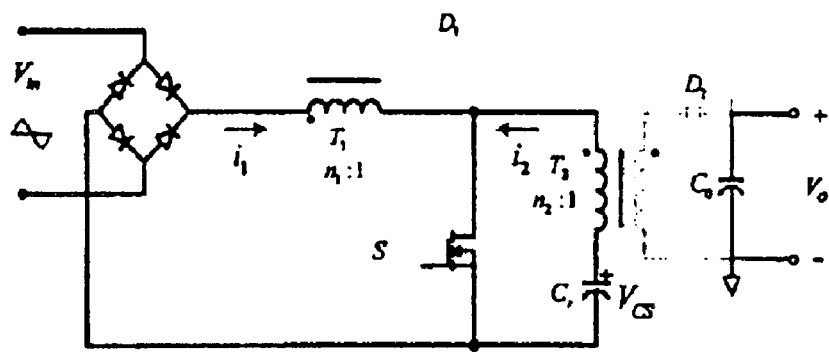
(b) Equivalent circuit during ON period
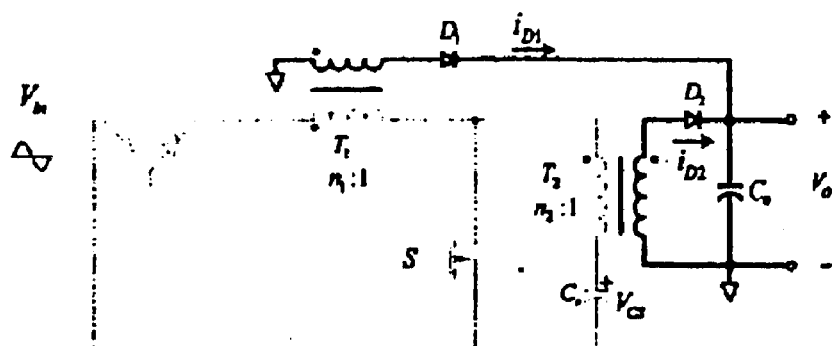
(c) Equivalent circuit during OFF period
Fig. 3. Operation of flyback mode

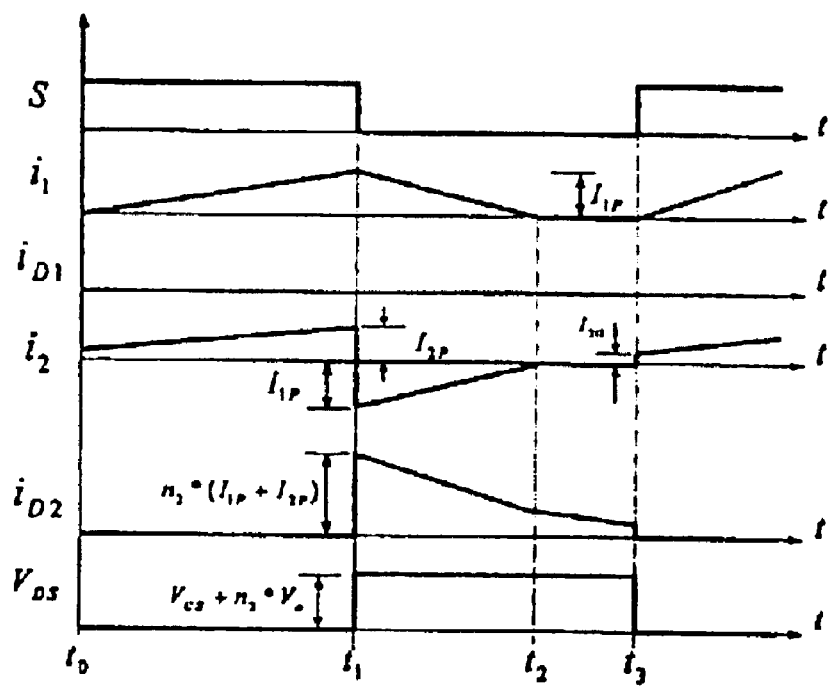
(a) Operation waveforms
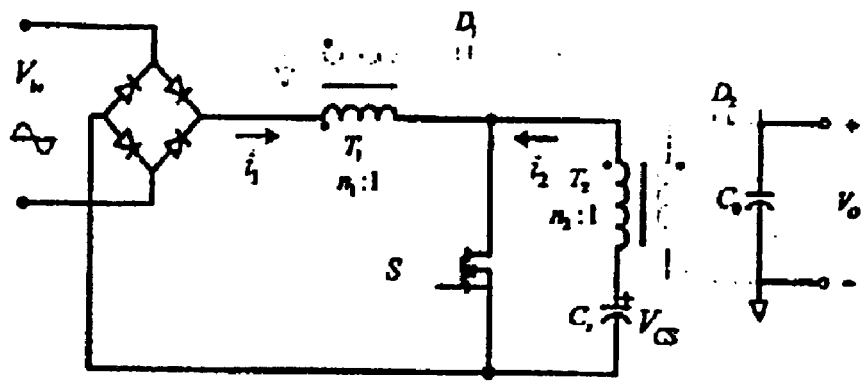
(b) Equivalent circuit during ON period
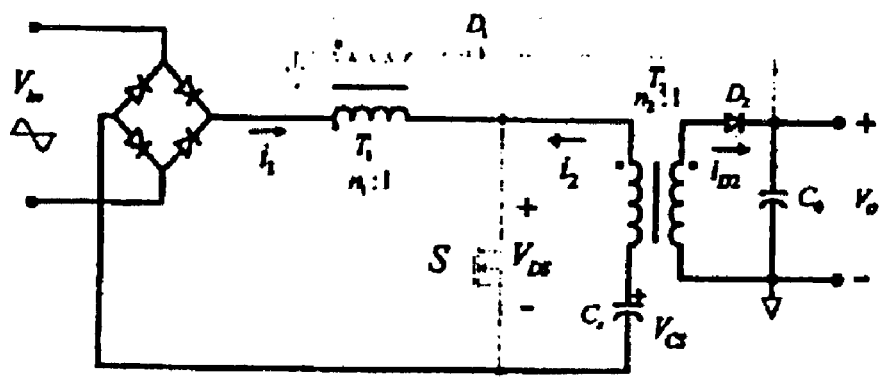
(c) Equivalent circuit during OFF period
Fig. 4. Operation of boost mode

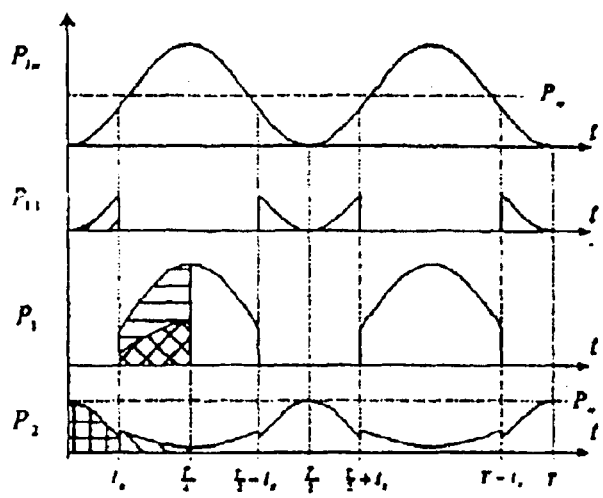
Direct transferred power by T1    Direct transferred power by T2
$W_{c1}$: discharging    $W_{c2}$: discharging    $W_{c3}$: charging
Pin: Input power
P11: Power transferred by T1 at flyback mode
P1: Power transferred by T1 at boost mode
P2: Power delivered by T2
Fig. 5 Power flow over a line period
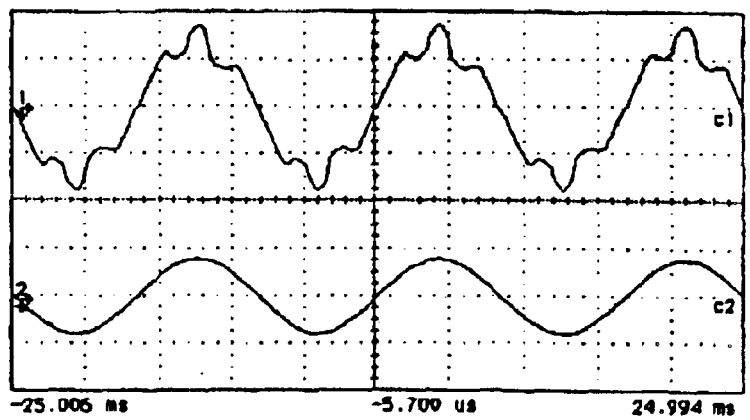
Fig. 6. Input current and input voltage at 100W output and 110V input
Top: current (1A/div) Bottom: voltage (200V/div)

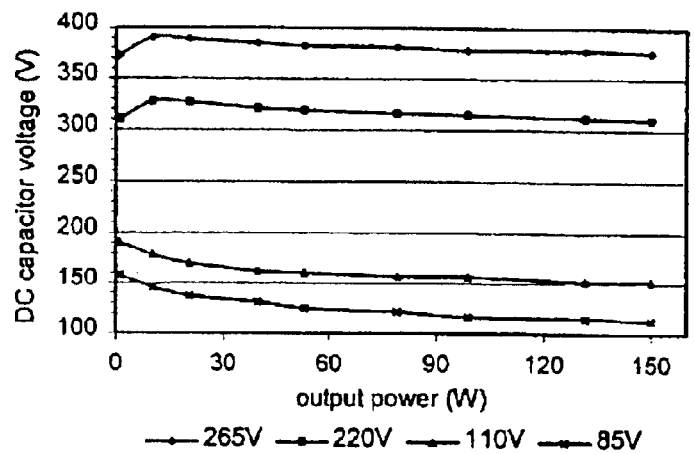
Fig. 7. Measured intermediate bus voltage versus output power
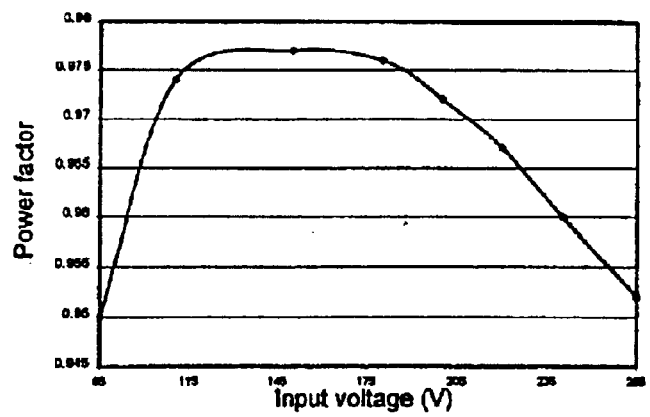
Fig. 8. Measured power factor at 150W load
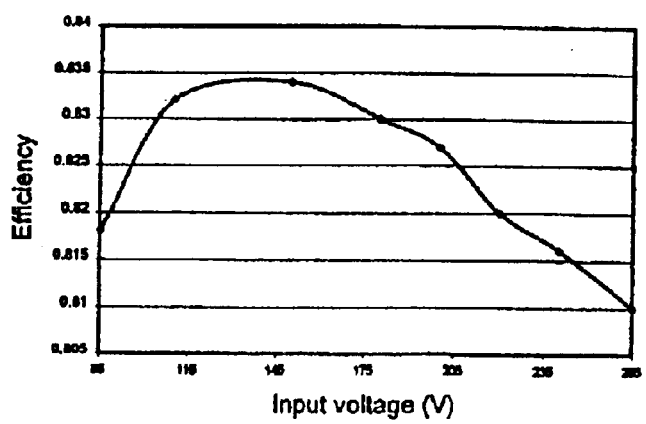
Fig. 9. Measured efficiency at 150W load

LOW COST AC/DC CONVERTER WITH POWER FACTOR CORRECTION

This invention relates to alternating current (ac)/direct current (dc) converter power supplies and more particularly to those which employ a Power Factor Correction (PFC) topology which integrates two flyback topologies enabling a simple control circuit and claims the benefit of priority to U.S. Provisional Application Ser. No. 60/363,145 filed Mar. 8, 2002.

BACKGROUND AND PRIOR ART

A PFC converter is necessary for many electronic equipments to meet harmonic regulations and standards. For low power applications, single stage PFC converter is a better choice considering cost and performance.

Typical single-stage PFC topologies with tight output voltage regulation were proposed in the paper by Redl, R.; Balogh, L.; Sokal, N. O., "A New Family of Single-Stage Isolated Power-Factor Correctors with Fast Regulation of the Output Voltage", PESC '94, P1137–1144, vol. 2, June 1994. In those topologies, a PFC cell is integrated with a Direct Current/Direct Current (DC/DC) conversion cell, and both cells share active switches and controller, but suffer from high intermediate bus voltage and high current stresses.

Some methods to reduce the intermediate bus voltage were discussed in the paper by Qiao, Chongming' Smedley, K. M., "A Topology Survey of Single-Stage Power Factor Corrector with a Boost Type Input-Current-Shaper" APEC 2000, P460–467, Vol. 1, March 2000. Unfortunately, those methods brings high distortion to the line current waveform, resulting in reduced power factor.

One approach to limit intermediate bus voltage was proposed in the publication by Luo, et al., "Flyboost Power Factor Correction Cell and Its Applications in Single-Stage AC-DC Converters", PSEC, 2002. By adding a secondary winding to the boost inductor, there was provided two discharging paths for boost inductor: to the intermediate storage capacitor or directly to the load. It means that some input power is directly transferred to the load without being processed by DC/DC conversion cell, referred as parallel power transfer in both the publications by: Jiang, Y.; Lee, F. C.; Hua, G.; Tang, W., "A Novel Single-Phase Power Factor Correction Scheme", APEC '93, P287–292, March 1993; and Garcia, O.; Cobos, J. A.; Prieto, R.; Alou, P.; Uceda, J.; "Power Factor Correction: A Survey", PESC '01, P8–13 vol. 1, June 2001.

These approaches limit the intermediate bus voltage with little influence on input current waveform, and allow the DC/DC conversion cell to operate in a continuous conduction mode (CCM) without high voltage punishment at light load conditions.

Various patents have been proposed in this area but fail to overcome all the problems of the prior art.

A search was also carried out with the following results:

U.S. Pat. No. 5,146,394 to Ishii, et al discloses the use of only one power transformer; U.S. Pat. No. 5,796,595 to Cross has two transformers that are not connected in series and is not for Power Factor Correction applications; U.S. Pat. No. 5,909,361 to Kim discloses the use of only one power transformer; U.S. Pat. No. 5,982,638 to Tang, et al discloses the use of only one power transformer; U.S. Pat. No. 6,005,782 to Jain, et al. discloses the use of only one transformer to deliver the energy to the output and is not for Power Factor Correction applications; U.S. Pat. No. 6,031,747 to Ilic, et al, has no transformer, does not work as a Power Factor Correction cell and is not for Power Factor Correction applications; U.S. Pat. No. 6,115,267 to Herbert wherein the transformer does not work in the Flyback mode and is and without an intermediate DC bus capacitor; U.S. Pat. No. 6,272,027 B1 to Fraidlin, et al has only one transformer and no intermediate DC bus capacitor; U.S. Pat. No. 6,281,666 B1 to Tressler, et al which is not for Power Factor Correction applications and has no intermediate DC bus capacitor; and, U.S. Pat. No. 6,282,109 B1 to Fraidlin, et al has no isolation, no Flyback transformer nor an intermediate DC bus capacitor.

Thus, the need exists for a lower cost, lower bus voltage DC/DC conversion cell that can operate in Continuous Conduction Mode (CCM).

SUMMARY OF THE INVENTION

It is a primary objective of the present invention to develop a power factor correction topology which limits the intermediate bus voltage to less than 400 volts for universal voltage applications.

Another object of this invention is to provide a PFC topology which provides two discharge paths for the choke inductor whereby the intermediate bus voltage has reduced influence on the input current waveform.

A further object of this invention is to provide a low cost low power AC/DC converter power supply.

A preferred embodiment of the integrates two flyback topologies to enable switching with only a single switch while also requiring only a single capacitor for all universal voltage applications under 400 volts.

Further objects and advantages of this invention will be apparent from the following detailed description of presently preferred embodiments which are illustrated schematically in the accompanying drawings.

BRIEF DESCRIPTION OF THE FIGURES

FIG. 1(a) is a schematic of the basic topology of the Bi-flyback PFC converter.

FIG. 1(b) schematic of the Bi-flyback PFC converter with a low loss snubber circuit.

FIG. 1(c) is a schematic of the bi-flyback PFC converter with an active clamp circuit.

FIG. 2 shows the operation mode in one line period.

FIG. 3(a) shows the operation waveforms resulting from operation of the flyback mode FIG. 3(b) shows the equivalent circuit during the ON period in operation of the flyback mode FIG. 3(c) shows the equivalent circuit during the OFF period in operation of the flyback mode FIG. 4(a) shows the operation waveforms resulting from operation of the boost mode FIG. 4(b) shows the equivalent circuit during the ON period in operation of the boost mode FIG. 4(c) shows the equivalent circuit during the OFF period in operation of the boost mode FIG. 5 shows the power flow over a line period.

FIG. 6 illustrates the input current and input voltage at 100 W output and 110V input.

FIG. 7 graphs the measured intermediate bus voltage versus output power.

FIG. 8 graphs the measured power factor at a 150 W load.

FIG. 9 graphs the measured efficiency at a 150 W load.

DESCRIPTION OF THE PREFERRED EMBODIMENTS

Before explaining the disclosed embodiments of the present invention in detail, it is to be understood that the invention is not limited in its application to the details of the particular arrangements shown since the invention is capable of further embodiments. Also, the terminology used herein is for the purpose of description and not of limitation According to this invention, the above objects can be achieved by a single stage Bi-flyback Power Factor Correction (PFC) topology. The advantages and features of the present invention will be apparent upon consideration of the following description.

The Bi-flyback topology consists of two flyback circuits, as shown in FIG. 1(a). The first PFC flyback circuit is composed of transformer T1 120, rectifier input bridge 140, diode $D_1$ 160, output filter capacitor $C_o$ 180 and Power Metal Oxide Silicon Field Effect Transistor (MOSFET) Switch (S) 200. The second Direct Current/Direct Current (DC/DC) flyback circuit includes transformer T2 220, intermediate bus capacitor $C_S$ 240, diode $D_2$ 260, output filter capacitor $C_o$ 180 and the same Power MOSFET Switch (S) 200. The PFC cell operates under the Discontinuous Conduction Mode (DCM) and the DC/DC conversion cell operates under a Conduction Mode of the class of the Continuous Conduction Mode (CCM) and DCM during the entire line period.

The above referenced second DC/DC flyback circuit operates similar to a DC/DC flyback circuit. For the first PFC flyback circuit, there are two discharging paths for transformer T1 120, depending on instantaneous input voltage and intermediate bus voltage. When input voltage is low, T1 120 will discharge its magnetizing energy to the load 280 via diode $D_1$ 160 during S 200 OFF period, like the typical flyback transformer. When input voltage is high, T1 120 operates like a boost inductor and discharges its magnetizing energy to intermediate bus capacitor 240 through T2's 220 primary winding.

When T1 120 operates like flyback transformer, it is referred to as the flyback mode, and as the boost mode when T1 120 works as boost inductor. So there are two operational modes for this topology. The operational modes over one line cycle are shown in FIG. 2.

In FIG. 1(b), one low loss snubber circuit, comprised of diode 222 and diode 224, capacitor 228, and inductor 226, is added to basic Bi-flyback topology to absorb the voltage spike across the main switch S when it is turned off. In FIG. 1(c), one active clamp ciruit, comprised of capacitor 232 and MOSFET switch s 234, is used to carry out snubber function and zero voltage switching for the main switch.

A. Flyback Mode

When rectified line voltage $|V_{in}(t)|$ is less than $V_{CS}+n_2V_o-n_1V_o$ ($n_1$: the turn ratio of T1 120, $n_2$: the turn ratio of T2 220), Transformer T1 120 works like a flyback transformer, and the topology operates like two independent flyback converters. All input power during this mode is directly transferred to the load 280 through T1 120. Meanwhile, the DC/DC flyback cell will deliver some power from intermediate capacitor 240 to load 280, in order to keep tight output voltage regulation. The equivalent circuits and operational waveforms are shown in FIG. 3.

Interval 1 ($t_0$~$t_1$): Switch S 200 is turned on at $t_0$. The rectified line voltage $|V_{in}(t)|$ is applied to primary winding of T1 120. The current in T1 120, $i_1$ in FIG. 3, increases linearly. The intermediate bus voltage $V_{CS}$ is applied to primary winding of transformer T2 220, causing its current $i_2$ to linearly increase also. Since PFC cell operates in DCM, $i_1$ starts increasing from zero.

Interval 2 ($t_1$~$t_2$): S 200 is turned off at $t_1$. T1 120 discharges through its secondary winding and deliveries stored magnetizing energy to the load 280. The current ($i_{D1}$) in T1 120 secondary winding decreases linearly. T2 220 also discharges its magnetizing energy to the load 280 via its secondary winding. The voltage across transformer T1 120 primary winding is $n_1V_o$, while the voltage across T2 220 primary winding is $n_2V_o$. So the voltage across switch S 200, $V_{DS}$, is equal to $V_{CS}+n_2V_o$, which is higher than $|V_{in}(t)|+n_1V_o$. The input rectifier bridge 140 is blocked.

Interval 3 ($t_2$~$t_3$): At $t_2$, all magnetizing energy in T1 120 is transferred to the load 280. Current $i_{D1}$ reaches zero and diode $D_1$ 160 keeps it at zero. The current in T2 220 secondary winding, $i_{D2}$, continues to decrease until the switch 200 is turned on at $t_3$. Then a new switching cycle begins. Switching period $T_S$ is equal to $t_3-t_0$.

B. Boost Mode

When the line voltage goes higher, $|V_{in}(t)|>V_{CS}+n_2V_o-n_1V_o$, the voltage in transformer T1 120 primary winding during S 200 OFF period is $V_{DS}-|V_{in}(t)|$, i.e. $V_{CS}+n_2V_o-|V_{in}(t)|$, which will be less than $n_1V_o$. It means that diode $D_1$ 160 in T1 120 secondary winding discharge path will not conduct. T1 120 works like a boost inductor and discharges its magnetizing energy only through its primary winding. At this mode will operate as BIFRED topology. T1 120 transfers some input power to intermediate storage capacitor $C_S$ 240 and some input power to the load 280 through T2 220. Meanwhile, T2 220 will also transfer some power from intermediate capacitor 180 to the load 280 in order to keep tight output voltage regulation. The equivalent circuits and operational waveforms are shown in FIG. 4.

Interval 1 ($t_0$~$t_1$): S 200 is turned on at $t_0$, resulting in rectified line voltage $|V_{in}(t)|$ applied to T1 120. The current in T1 120 primary winding, $i_1$ in FIG. 4, increases linearly. And the voltage across the intermediate bus capacitor 180, $V_{CS}$, is applied to T2 220 primary winding, which causes the current $i_2$ in FIG. 4 to linearly increase also.

Interval 2 ($t_1$~$t_2$): Switch S 200 is turned off at $t_1$. T1 120 current $i_1$ will decrease linearly and discharge its magnetizing energy through DC/DC transformer T2 220 primary winding and intermediate capacitor 240. So T2 220 primary winding current $i_2$ is equal to T1 120 current $i_1$, which will be reflected to T2 220 secondary winding. The current ($i_{D2}$) in T2 220 secondary winding consists of magnetizing current of T2 220 and reflected current of T1 120 current $i_1$. And T2 220 magnetizing current will decrease linearly since output voltage is applied to T2 220 secondary winding. The voltage across T2 220 primary winding is $n_2V_o$. So the voltage across S, $V_{DS}$, is equal to $V_{CS}+n_2V_o$. The voltage across transformer T1 120 primary winding is $V_{CS}+n_2V_o-|V_{in}(t)|$.

Interval 3 ($t_2$~$t_3$): At $t_2$, $i_1$ reaches zero and the input rectifier bridge 140 prevents it from going negative. And $i_{D2}$, which only consists of magnetizing current of T2 220 in this interval, continues to decrease until the switch is turned on at $t_3$. At $t=t_3=t_0+T_S$, the switching cycle repeats.

C. Features

By adding another discharging path to PFC inductor, the following benefits occur:

a) The maximum intermediate bus voltage is limited. Only at boost mode when input voltage is higher than $V_{CS}+n_2V_o-n_1V_o$, intermediate bus capacitor $C_S$ 180 is charged by input power. The higher the intermediate bus voltage, the less charging power. So the maximum intermediate bus voltage will be limited to $V_{in,peak}+n_1V_o-n_2V_o$. Carefully selecting transformer turn ratio $n_1$ and $n_2$, the maximum intermediate bus voltage can be set to a little higher than the peak value of input voltage to achieve low voltage stresses and high power factor. For universal voltage (85~265$V_{AC,RMS}$) applications, the maximum intermediate bus voltage can be controlled to less than 400 VDC, allowing single commercial 450 VDC capacitor to be used in this topology. Since the maximum intermediate bus voltage is limited, DC/DC conversion cell can operate in CCM for low current stresses, without problem of high voltage at light load existing in the conventional single-stage PFC converters.

b) A portion of the load power is processed by the main switch only once. In the flyback mode, all input power is directly transferred to load by T1 120. In the boost mode, some input power is directly transferred to the load by T2 220, and some input power is stored in intermediate bus capacitor 240 and then delivered to the load 280 by the DC/DC cell. So the total power processed by active switch 200 is less than that in conventional single-stage PFC converter.

In FIG. 5, the power flows of Bi-flyback topology are illustrated. There are two directly transferred power portions. When instantaneous input voltage is low and Bi-flyback operate under flyback mode, all input power is transferred to output directly by T1 120. So P11 will be equal to input power. When the circuit enters boost mode, some input power is transferred to output by T1 120. The sum of the power provided by T1 120 and T2 220 should be equal to output power, so the power provided by T2 220 will be equal to the difference between output power and directly transferred power.

Experimental Results

One prototype based on the topology shown in FIG. 1(c) has been built and tested to verify its operation principle. The main specifications were:

Input: approximately 85—approximately 265V AC'RMS
Output: approximately 28 VDC @ approximately 150 W
Switching frequency: approximately 200 kHz
T1 120: primary inductance $L_1=30$ μH, turn ratio n1=4
T2 220: primary inductance $L_2$=approximately 375 μH, turn ratio n2=approximately 3.8
Rectifier Input Bridge 140: line voltage rectifier rated at approximately 600 V. $D_1$ 160: approximately 200V/10 Amps fast recovery diode
$D_2$ 260: approximately 200V/10 Amps fast recovery diode
Power MOSFET s 200: approximately 600V/10 Amps MOSFET
Intermediate capacitor $c_s$ 240: approximately 450V/ approximately 150 μF Aluminum capacitor
Output capacitor $c_o$ 180: approximately 450V/ approximately 1000 μF Aluminum capacitor
Load 280: approximately 150w DC load.

FIG. 6 shows experimental waveforms of input current and voltage at 100 W output and 110V AC.RMS input.

FIG. 7 shows the variation of intermediate bus voltage versus output power at different input voltage conditions. The maximum voltage across intermediate capacitor is about approximately 390VDC for universal input voltage and al] load condition.

FIGS. 8 and 9 gives the measured power factor and efficiency versus input voltage at 150 W load. Measured power factor is approximately 0.974 with approximately 83.2% efficiency at approximately 110V input and approximately 150 W load.

It would be useful to now list the key features of the invention which include:

1. Reduced cost and improved reliability due to least components;
2. Reduced current stress. It can be shown from $i_{L1}$ in FIG. 3(a), the existence of interval $M_3$ can effectively reduce the peak current value of main switch when transferring the same average output current. Therefore, the main switch can be turned off under reduced current stress;
3. Reduced voltage stress. Since storage capacitor is charged under the governing equation: $V_{CS}<V_{in}(t)+n_1V_o-n_2V_o$, therefore, using a flyback transformer to replace the traditional input inductor brings about inherent DC Bus voltage clamping capability. Properly selected $n_1$ and $n_2$ can guarantee the DC bus voltage well above the peak value of the input voltage, as a consequence, the commercial available 450VDC capacitor can be used, and moreover, approximately 600V components can be used in power stage for universal input applications;
4. Direct energy transfer. In discharge mode, the input current is directly delivered to the output through the input flyback transformer $T_1$. In charge mode, partial power is further directly transferred to the output through $T_1$ and $T_2$ without storing in $C_S$ first;
5. Higher efficiency. More than half energy transferred to the load without processed twice undoubtedly can increase the overall efficiency. For the currently existed cascade two-stage or single stage approaches, basically, the power is processed serially by PFC cell and DC/DC cell, the overall efficiency is given by the product of two stage efficiencies, i.e., $\eta=\eta_1\eta_2$, where $\eta_1$ and $\eta_2$ are the efficiencies of two stages respectively. In the proposed topology, supposing k is the ratio at which power is transferred to the output just through PFC stage. Then, the efficiency of the proposed structure can be expressed as $\eta=k\eta_1+(1-k)\eta_1\eta_2>\eta_1\eta_2$. Obviously the overall efficiency can be improved by minimizing the power process times. In addition, reduced current stress also brings about higher efficiency due to reduced turn off losses;
6. Low turn off spikes. The snubber capacitor $C_1$ can effectively suppress the turn off spikes of the main switch, and in each switching cycle, its stored energy can also be released to the output through the coupling winding at the moment of main switch being turn on; and,
7. High power application. Two flyback transformers configuration has the potential to increase the power conversion rating and also release the thermal design difficulties due to distributed heat dissipation.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A single stage bi-flyback Power Factor Correction (PFC) converter power supply comprising the combination:

(a) a PFC cell containing a first flyback integrated circuit which operates in the Discontinuous Conduction Mode (DCM); and, (b) a Direct Current/Direct Current (DC/DC) conversion cell containing a second flyback integrated circuit which operates in the Conduction Mode of the class consisting of the Continuous Conduction Mode(CCM) and Discontinuous Conduction Mode(DCM);

(c) a single capacitor and a single switch, wherein power factor correction(PFC) and high efficiency occurs with the first flyback integrated circuit and the second flyback integrated circuit through the single capacitor and the single switch; and (d) a continuous direct current(DC) voltage of less than approximately 400 volts, wherein one of the first and the second flyback integrated circuits is continuously operated without interruption in the discontinuous conduction mode(DCM) to achieve the high power factor correction(PFC) when operating the first flyback integrated circuit and the second flyback integrated circuit with the single switch and the single capacitor.

2. The PFC converter power supply of claim 1 further comprising: a low loss snubber circuit to absorb the voltage spike by transformer leakage inductance, and to suppress turn off spikes of the single switch for achieving the power factor correction(PFC).

3. The PFC converter power supply of claim 2 further comprising: an active clamp circuit to carry out soft-switching and snubber function during the power factor correction(PFC).

4. The PFC converter power supply of claim 1 wherein said first flyback circuit includes: a first transformer, a rectifier, an input bridge, diode, output filter capacitor and a power switch which is a Metal Oxide Silicon Field Effect Transistor(MOSFET).

5. The PFC converter power supply of claim 1 wherein said second flyback circuit includes: a second transformer, an intermediate bus capacitor, a second diode, an output filter capacitor and a power switch which is a MOSFET.

6. The PFC converter power supply of claim 1 wherein said first flyback circuit operates as an existing flyback circuit when the input voltage is less than a pre-defined amount.

7. The PFC converter power supply of claim 1 wherein said first flyback circuit operates as a boost circuit when the input voltage exceeds a pre-defined amount.

8. A method providing a power supply comprising the steps of:

(a) operating a PFC(power factor correction) cell containing a first flyback integrated circuit in a discontinuous conduction mode(DCM); and, (b) operating a direct current/direct current(DC/DC) conversion cell containing a second flyback integrated circuit in a conduction mode of a class consisting of a continuous conduction mode(CCM) and a discontinuous conduction mode (DCM);

(c) providing a single switch and a single capacitor, whereby said single switch and the single capacitor provides a high power factor and high efficiency in the first flyback integrated circuit and the second flyback integrated circuit;

(d) operating one of the first and the second flyback correction circuits continuously without interruption in the discontinuous conduction mode (DCM) to achieve high power factor correction(PFC); and (e) providing a continuous DC voltage of less than approximately 400 volts to achieve the high power factor correction(PFC) when the first flyback integrated circuit and the second flyback integrated circuit are being operated.

9. The method of claim 8 includes the step of:

operating in combination a low loss snubber circuit to offset transformer leakage inductance; and suppressing turn off spikes from the single switch for the power factor correction(PFC) with the low loss snubber circuit.

10. The method of claim 8 includes the step of: providing an active clamp circuit to the supply whereby zero voltage switching is realized during the power factor correction (PFC).

* * * * *